Oct. 3, 1950     E. SCHULTZ, JR     2,524,236
CASTER
Filed Nov. 18, 1946
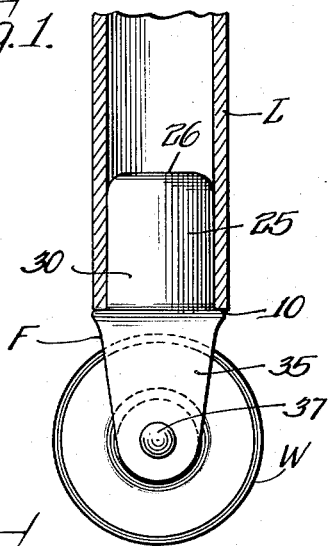
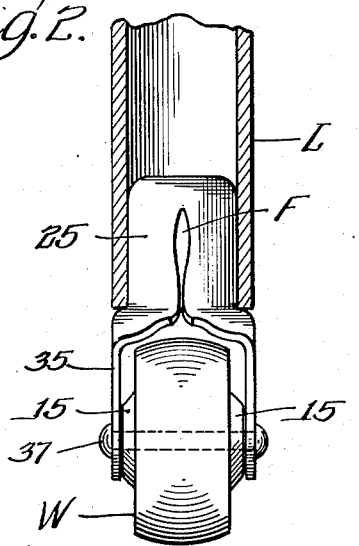
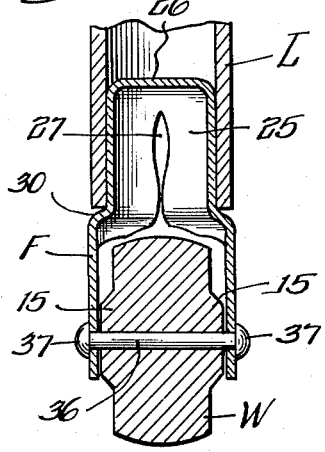
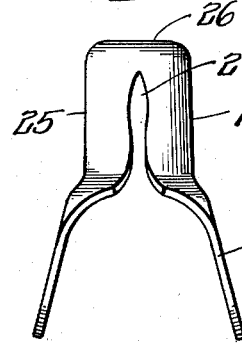
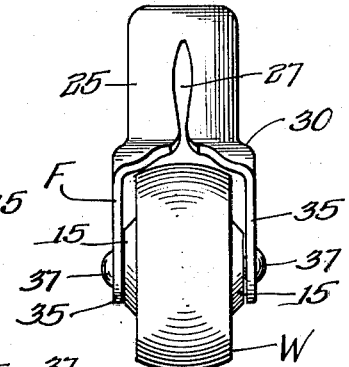
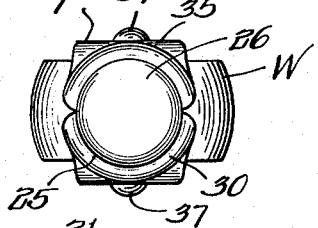
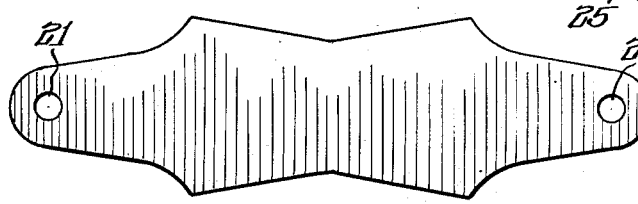
INVENTOR.
Edward Schultz Jr
BY Patented Oct. 3, 1950

2,524,236

UNITED STATES PATENT OFFICE 2,524,236

CASTER

Edward Schultz, Jr., Chicago, Ill., assignor to The Nagel-Chase Mfg. Co., Chicago, Ill., a corporation of Illinois Application November 18, 1946, Serial No. 710,694

3 Claims. (Cl. 16—31)

My invention relates to a very simple and sturdy caster which is adapted to be fitted to the bottom end of a tubular leg depending from any supported structure. The improvements which make up this invention are directed primarily to the simplicity of the framework wherein the caster wheel is mounted, the ease and dependability with which it may be secured operatively to its associated leg, and the compactness of its entire framework which permits the caster to remain inconspicuous when secured in operative position.

A suggestive embodiment of this invention is set forth in the accompanying drawing wherein:

Fig. 1 is a vertical section through the bottom end of a tubular leg wherein is fitted the present caster which is shown in elevation;

Fig. 2 is a similar view, with the section taken in a plane at right angles to that of Fig. 1;

Fig. 3 is a view similar to Fig. 2, except that the framework of the caster is also shown in section;

Fig. 4 is a view in elevation of the formed-up framework prior to the assembly of the caster wheel therewith;

Fig. 5 shows in elevation the framework and caster wheel in finally assembled relation;

Fig. 6 is a top plan view of the caster; and

Fig. 7 is a view of the blank from which the framework is produced.

The bottom portion of a tubular leg L is shown in Figs. 1, 2, and 3. This leg may be cylindrical in form with its end 10 terminating in a plane transverse to the axis of the leg.

The caster which I have devised for application to such a leg comprises a framework F and a wheel W. The wheel may be formed of any appropriate material, desirably a suitable composition, with a center hole surrounded by circular bosses 15 extending from opposite ends of the wheel.

The framework is desirably made of sheet metal having some property of resilience. Initially it is blanked out to approximately the form shown in Fig. 7. It is symmetrical upon opposite sides of a longitudinal center line, and provided with a hole 21 near each end. The edges of the blank are such that, when it is formed up into a framework, there will be provided a substantially cylindrical head 25 closed at the top 26 and bisected at 27 for the major part of its length to provide two complementary spring sections. In the completely formed framework, the slot 27 which bisect the head are nearly closed (see Fig. 3) in response to an external pressure that is directed radially inwardly. Such a pressure is encountered when the head is fitted into the bottom end of a tubular leg L of proper size. The two sections of the head are required to be inwardly sprung when reaching this position, and consequently remain frictionally engaged with the leg so as to remain secured thereto.

At the base of the head is a shoulder 30 which may be continuous on opposite sides of two slots 27. This shoulder is adapted to receive the end thrust from the bottom end 10 of the leg. Below the shoulder the framework comprises a pair of depending arms 35. Near the lower ends of these arms the holes 21 are positioned, one opposite the other.

The wheel W is adapted to be fitted within the framework, between the two arms 35. An axle pin 36 is inserted through the wheel and also through the holes 21 in the pins, the ends 37 of the pin being formed into heads which engage the outer faces of the arms. When so assembled in place, the wheel will remain securely and permanently in position therein, and rotatable freely upon its axle.

The spacing of the arms 35 on opposite sides of the wheel is such as to leave a very slight but definite clearance to the outside of the wheel bosses 15. In this way I avoid any end pressure such as might interfere with free movement of the wheel. At the same time, the two arms, when secured through the medium of the axle pin 36, leave their free ends sufficiently spaced from each other to require a slightly inward deflection when the head 25 is fitted into the leg L. A clearance of the arms from the wheel ends is maintained even when the head is contracted, as during assembly thereof within an associated leg.

The simplicity of the structure should be obvious. Also there is ample sturdiness to meet all conditions encountered in service. The vertical load imposed upon the caster is received first by the shoulder at the base of the head, and thence transmitted through the arms to the wheel which is rollably rested on the floor of the room or platform where the supported structure is placed. There is no portion of the framework that extends outwardly beyond the confines of the tubular leg; in fact, the wheel may be of a sufficiently small diameter to avoid any projection beyond the confines of the leg. The diameter of the wheel is variable within the limits of the space afforded by the archway within the framework.

I claim:

1. A caster comprising a wheel, an axle extending through the wheel, and a resilient framework comprising a short, stubby, substantially cylindrical head closed at the top and of a substantially uniform diameter greater than the thickness of the body of the wheel and formed along opposite sides with slots extending in parallelism from the lower end of the head to within a short distance of the upper end thereof and dividing the head into two semi-cylindrical, laterally contractible, spring sections expansible outwardly and compressible into cylindrical form by insertion into a tubular furniture leg and when so inserted fitting tightly therewithin and frictionally engaging the interior thereof throughout the entire length of the head, whereby the caster is secured to the tubular leg, a pair of parallel arms, one along each end of the wheel and each formed with a hole to receive the axle whereby to provide a mounting whereon the wheel is free to rotate, and an outset shoulder surmounting each arm and extending arcuately throughout less than 180° about a common center and connecting the arms with the spring sections of said head.

2. A caster comprising a wheel, an axle extending through the wheel, and a resilient framework comprising a short, stubby, substantially cylindrical head closed at the top and of a substantially uniform diameter greater than the thickness of the body of the wheel and formed along opposite sides with slots extending in parallelism from the lower end of the head to within a short distance of the upper end thereof and dividing the head into two semi-cylindrical, laterally contractible, spring sections expansible outwardly and compressible into cylindrical form by insertion into a tubular furniture leg and when so inserted fitting tightly therewithin and frictionally engaging the interior thereof throughout the entire length of the head, whereby the caster is secured to the tubular leg, a pair of parallel arms, one along each end of the wheel and each formed with a hole to receive the axle whereby to provide a mounting whereon the wheel is free to rotate, and an outset shoulder surmounting each arm and extending arcuately throughout less than 180° about a common center and connecting the arms with the spring sections of said head, and said arms being normally spaced apart from the ends of the wheel therebetween a sufficient distance so that when the head is contracted the arms will lie clear of the supported wheel to permit free rotation thereof.

3. A caster comprising a wheel, an axle extending through the wheel, and a resilient framework comprising a short, stubby, substantially cylindrical head closed at the top and of a substantially uniform diameter greater than the thickness of the body of the wheel and formed along opposite sides with slots extending in parallelism from the lower end of the head to within a short distance of the upper end thereof and dividing the head into two semi-cylindrical, laterally contractible, spring sections expansible outwardly and compressible into cylindrical form by insertion into a tubular furniture leg and when so inserted fitting tightly therewithin and frictionally engaging the interior thereof throughout the entire length of the head, whereby the caster is secured to the tubular leg, a pair of parallel arms, one along each end of the wheel and each formed with a hole to receive the axle whereby to provide a mounting whereon the wheel is free to rotate, and an outset shoulder surmounting each arm and extending arcuately throughout less than 180° about a common center and connecting the arms with the spring sections of said head, said head being initially of greater diameter than the interior of the open end of the tubular leg and being slightly contracted when introduced therein, the contraction of the head moving the arms depending therefrom toward each other but not a sufficient distance to interfere with free rotation of the wheel therebetween.

EDWARD SCHULTZ, Jr.

REFERENCES CITED

The following references are of record in the file of this patent:

UNITED STATES PATENTS

| Number | Name | Date |
| --- | --- | --- |
| 383,525 | Hart | May 29, 1888 |
| 400,814 | Wright | Apr. 2, 1889 |
| 454,257 | Crean et al. | June 16, 1891 |
| 568,025 | Graessle | Sept. 22, 1896 |
| 1,836,246 | Herold | Dec. 15, 1931 |
| 2,240,149 | Seyfried | Apr. 29, 1941 |